(12) United States Patent
Grichnik

(10) Patent No.: US 7,213,007 B2
(45) Date of Patent: May 1, 2007

(54) METHOD FOR FORECASTING USING A GENETIC ALGORITHM

(75) Inventor: Anthony J. Grichnik, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 611 days.

(21) Appl. No.: 10/327,676

(22) Filed: Dec. 24, 2002

(65) Prior Publication Data
US 2004/0139041 A1    Jul. 15, 2004

(51) Int. Cl.
G06E 1/00    (2006.01)
G06E 3/00    (2006.01)
G06F 15/18   (2006.01)
G06G 7/00    (2006.01)

(52) U.S. Cl. ...................................... 706/21
(58) Field of Classification Search ............... 706/21
See application file for complete search history.

(56) References Cited

U.S. PATENT DOCUMENTS

| | | | | |
|---|---|---|---|---|
| 5,291,394 A | * | 3/1994 | Chapman | 705/8 |
| 5,319,781 A | | 6/1994 | Syswerda | 395/650 |
| 5,819,244 A | * | 10/1998 | Smith | 706/13 |
| 6,233,493 B1 | | 5/2001 | Cherneff et al. | 700/95 |
| 6,826,521 B1 | * | 11/2004 | Hess et al. | 703/12 |
| 2004/0215551 A1 | * | 10/2004 | Eder | 705/38 |

FOREIGN PATENT DOCUMENTS

| | | |
|---|---|---|
| WO | WO 97/00490 | 1/1997 |
| WO | WO 98/08177 | 2/1998 |

OTHER PUBLICATIONS i2 Technologies Factory Planning and Scheduling, http://www.i2.com/Home/SolutionAreas/SupplyChainManagement/FactoryPlanningScheduling, visited Jul. 13, 2002, 2 pages.

* cited by examiner

*Primary Examiner*—Anthony Knight
*Assistant Examiner*—Michael B. Holmes
(74) *Attorney, Agent, or Firm*—Finnegan, Henderson, Farabow, Garrett & Dunner

(57) ABSTRACT

A method and system is provided to perform a process for forecasting the characteristics of a target item based on historical characteristic data. The process includes determining one or more equations that when solved present a representation of forecasted characteristics of the target item, wherein each of the one or more equations includes one or more variables. Further, the process involves determining a data value for each of the one or more variables that best represents the characteristics of the target item and solving the one or more equations using the determined data values to forecast the characteristics of the target item.

31 Claims, 5 Drawing Sheets

METHOD FOR FORECASTING USING A GENETIC ALGORITHM

TECHNICAL FIELD

This invention relates generally to methods of forecasting, and more particularly to systems, methods, and articles of manufacture of forecasting characteristics of a target item using a genetic algorithm.

BACKGROUND

One important factor in business management is profit. To increase profit, a business, such as a manufacturer, may desire to be able to provide its products to consumers in a cost efficient manner such that production costs are minimized. Further, a manufacturer may desire to have enough products readily available to meet the ever-changing demand of consumers. Without the ability to meet pending demand, a business may not only lose revenue due to missed current sales, but also revenue for future sales because customers may turn to competitors for similar products.

To ensure a manufacturer to meet pending demand, they may operate in three modes. First, the manufacturer may maintain an large inventory to ensure enough products are always on hand. Second, the manufacturer may operate their production facilities at a large capacity, thus always producing enough products to meet demand. And third, the manufacturer may perform a variation and/or combination of the two. Operating according to the first two modes would not be cost-efficient for a manufacturer due to storage and production costs. The third mode is difficult to optimize to ensure a manufacturer is producing products at a cost effective rate.

Accordingly, in order to reduce production costs while meeting demand, manufacturers have turned to process planning methodologies to optimize the performance of production operations. One conventional system that uses process planning methods is described in U.S. Pat. No. 6,233,493. This system uses genetic algorithms to determine the most cost efficient production sequence for a product based on models representing resources, tasks, products, and components of the products. The algorithm is used to determine the best development sequence a production process should employ to reduce production costs. Although the system described in U.S. Pat. No. 6,233,493 may adjust a production process to maximize the efficiency of the process, the system does not take into account external factors that may affect production costs, such as drops in demand, increases in storage costs, etc.

Another type of process planning methodology that is gaining popularity is forecasting methods that determine how many products, and of what type, to produce in order to meet future demand. Typically, conventional forecasting methods determine various external factors, such as economic indicators, that may affect product development and then attempt to forecast a demand for the product based on these factors. Although these forecasting methods take into account external factors, they do not effectively predict future demand. One reason is that the types of external factor that are determined may not provide proper data to adequately predict the proper future demand of a product. Another reason is that the influence of any collection of factors in product demand is not consistent over time. therefore, even if the correct date was being analyzed, the previous methods were inadequate to establish a useable relationship.

Methods, systems, and articles of manufacture consistent with certain embodiments of the present invention are directed to solving one or more of the problems set forth above.

SUMMARY OF THE INVENTION

In one embodiment of the present invention, a method for forecasting characteristics of a target item may be performed by a forecasting module. The method may include determining one or more equations that when solved present a representation of forecasted characteristics of the target item, whereby each of the one or more equations includes one or more variables. Further, the method may include determining a data value for each of the one or more variables that represents the characteristics of the target item more so than other data values. Also, the process of forecasting the characteristics of the target item by solving the one or more equations using the determined data values may be performed.

BRIEF DESCRIPTION OF THE DRAWINGS

The accompanying drawings, which are incorporated in and constitute a part of this specification, illustrate several aspects of the invention and together with the description, serve to explain the principles of the invention. In the drawings.

DETAILED DESCRIPTION

Reference will now be made in detail to the exemplary aspects of the invention, examples of which are illustrated in the accompanying drawings. Wherever possible, the same reference numbers will be used throughout the drawings to refer to the same or like parts.

Figure 1:
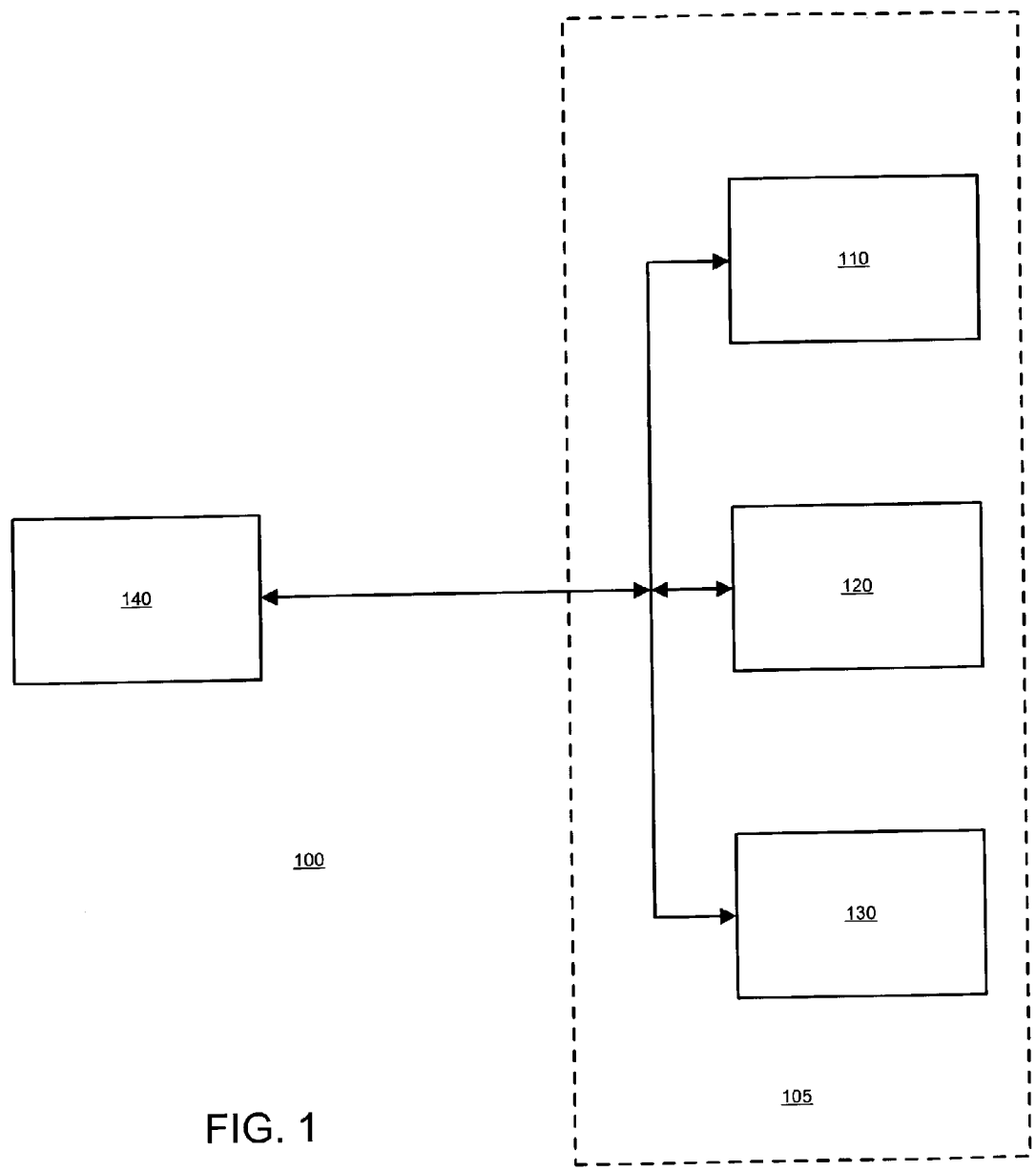
FIG. 1 illustrates an exemplary system that may be configured to perform certain functions consistent with certain embodiments of the present invention.

FIG. 1 illustrates an exemplary system 100 in which features and principles consistent with the present invention may be implemented. As shown in FIG. 1, system 100 may include a plurality of modules that perform various functions consistent with certain features related to the present invention. In one embodiment of the present invention, system 100 may include a forecasting module 105 and database 140.

Forecasting module 105 may be a computing system that performs various functions consistent with certain embodiments of the present invention. In one embodiment, forecasting module may be configured to forecast the demand for selected products based on historical production activities. Module 105 may include a processor 110, a memory module 120, and an interface module 130. Processor 110 may be one or more processor devices known in the art, such as a microprocessor, laptop computer, desktop computer, workstation, mainframe, etc. Memory module 120 may represent one or more storage devices that maintain information that is used by processor 110 and/or other entities internal and external to forecasting module 105. Interface module 130 may be one or more devices that facilitate the transfer of information between forecasting module 105 and external components, such as database 140.

Database 140 may represent one or more storage devices that store information used by forecasting processing module 105 to perform certain functions consistent with embodiments of the present invention. In one embodiment, database 140 stores product history data. A product, as used herein, may represent any type of physical good that is designed, developed, manufactured, and/or delivered by a source, such as, for example, a manufacturer or a distributor. Moreover, one skilled in the art would appreciate that a product may represent other types of goods, such as a non-physical object (e.g., stocks, financial commodities, etc.) that may be generated, obtained, delivered, bought, and/or sold.

Although FIG. 1 shows the configuration of modules 110–140 as separate elements, one skilled in the art would realize that system 100 may be implemented in a number of different configurations without departing from the scope of the present invention. For example, modules 110, 120, 130, and 140 may be combined into a single module that includes software, hardware, and/or a combination of both. Alternatively, system 100 may be configured as a distributed system, with modules 110, 120, 130, and 140 distributed in remote locations and interconnected by communication paths, such as Local Area Networks (LANs), Wide Area Networks (WANs), and any other type of network that may facilitate communications and the exchange of information between the modules and/or any other elements that may be implemented by system 100. Also, system 100 may include additional or fewer modules than those depicted in FIG. 1 without departing from the scope of the present invention.

Figure 2:
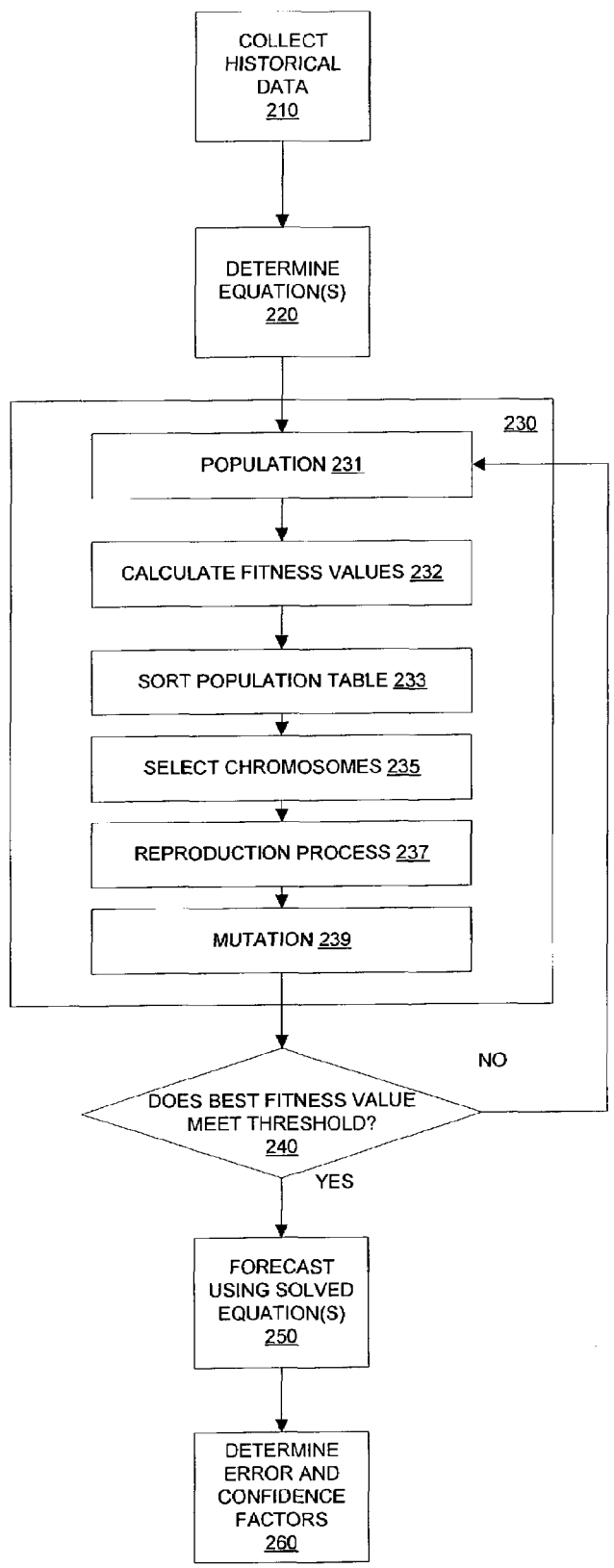
FIG. 2 illustrates a flowchart of an exemplary forecasting process consistent with embodiments of the present invention.

In one embodiment of the invention, exemplary system 100 may be configured to determine a sequence of equations that produce forecast information with a stated level of accuracy at a given point in time in the future. FIG. 2 shows a flowchart of an exemplary forecast process that may be performed by system 100. As shown, the forecast process may begin with obtaining historical data associated with the characteristics of a target item that is to be forecasted (Step 210). A target item, as used herein, may represent a tangible object, such as a product that is developed and built by a manufacturer. Alternatively, a target item may represent a non-tangible object, such as financial items (e.g., stocks, bonds, etc.) and mathematical representations (e.g., vibration analysis data). Although the forecast process shown in FIG. 2 will be described with respect to a product manufactured by a business entity, one skilled in the art would appreciate that the following description may apply to any type of target item.

Figure 3:
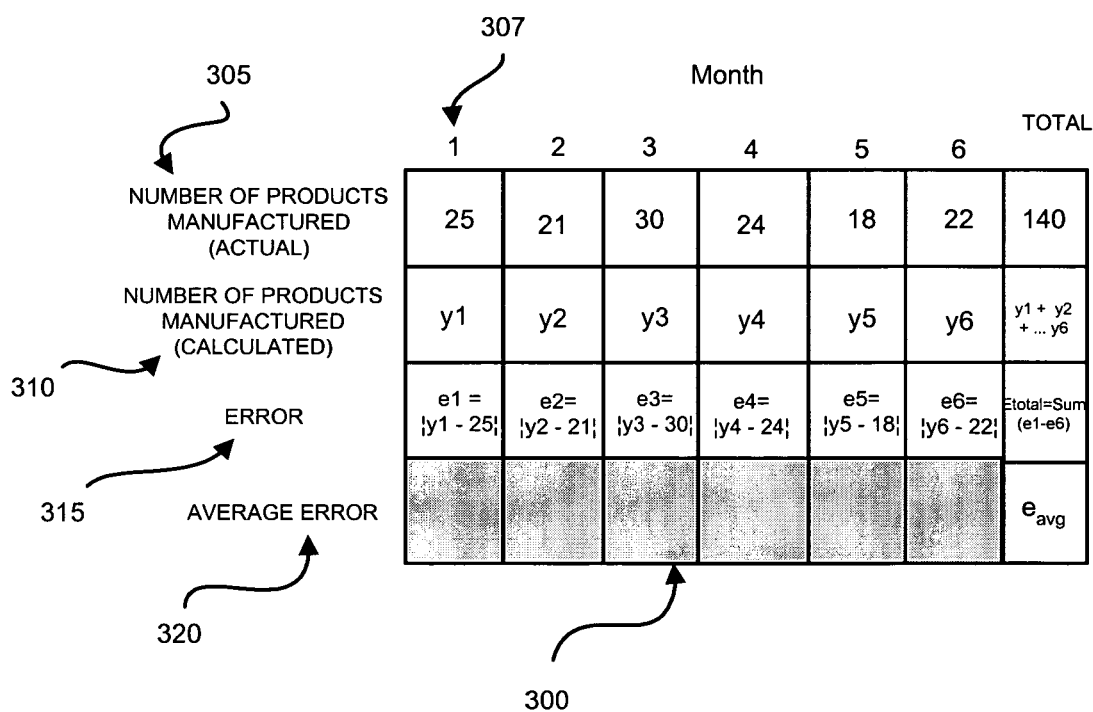
FIG. 3 illustrates a block diagram of an exemplary table including historical data consistent with embodiments of the present invention.

Characteristics, as used herein, may represent any type of attribute associated with a target item. For example, characteristics may include manufacturing, developing, design, ordering, sale, purchase, and shipping numbers associated with the target item. In one embodiment, forecasting module 105 may collect historical data associated with a product from database 140. In this exemplary scenario, the historical data may be configured to represent the number of units of the product manufactured over a predetermined period of time (t) in selected intervals (e.g., days, weeks, months, quarters, etc.). Alternatively, the historical data may represent the number of units of the product that was ordered or shipped from a business entity over the predetermined period of time t. Further, the historical data may represent the number of units of the product available during a certain stage of manufacture, such as molding stage, engine placement stage, etc. The selected intervals of time t may represent, for example, consistent periods of time over which equal sized blocks of time that the products are monitored. In this example, the historical data collected by forecasting module 105 represents the number of units of a product manufactured for each month over a period of six months. Therefore, time period t is equal to six (6). FIG. 3 shows a non-limiting example of a table 300 including the number of products manufactured over a period (t) of six months. As shown, table 300 includes an exemplary number of actual products manufactured (305) for each of a plurality of months (307) that make up the time period t.

The forecasting process shown in FIG. 2 may also determine one or more mathematical equations that would represent the manufacture of the products represented in the historical data (Step 220). For example, the forecasting process may establish a relationship based on a plurality of types of mathematical equations (e.g., polynomial, linear, sinusoidal, etc.). For example, in one embodiment, one or more analysis techniques may be used to establish a relationship between the historical data and the desired forecast. These techniques may include classical analysis techniques, such as multiple regression etc., data mining techniques, curve fitting processes, etc. A goodness of fit test may be used to access the performance of one relationship over another. In this exemplary scenario, the forecasting process determines that a linear and sinusoidal equation may represent the manufacture of the products by the business entity that provided the historical data.

The basic equation for a sinusoidal function is:

$$y = A * \mathrm{Sin}(B' * t + C), \text{ where}$$

A, B', and C are the gain, rate, and phase, respectively, in the sinusoidal function.

The basic equation for a linear function is:

$$y = m * x + B, \text{ where}$$

m and B are the slope and y intercept, respectively, of the linear function.

In addition to determining the types of equations that may be used during the forecasting process, module 105 may also determine boundaries for the selected one or more equations. Various boundary values may be defined for each variable in the selected one or more equations based on the characteristics and type of target item being forecasted. For example, in one embodiment of the invention, the boundaries for the selected sinusoidal and linear equations may be determined as:

Sinusoidal:

Gain: $(-\Delta P * 10) <= A <= (\Delta P * 10)$

Rate: $-\Delta t <= B' <= \Delta t$

Phase: $0 <= C <= (10 * \Delta t * \Pi/2)$

Linear:

Slope: $(\Delta P/(-\Delta t/2)) <= m <= (\Delta P/(\Delta t/2))$

Y intercept: $(-10 * \min) <= B <= (10 * \max)$ where, min is a minimum value of historical characteristics of a target item over the selected time period t and max is a maximum value of historical characteristics of a target item over the selected time period t, ΔP=max−min, and Δt=absolute value of (time interval at max−time interval at min).

Accordingly, forecasting module determines the boundary values for one or more variables included in the one or more equations selected in Step 220 based on the collected historical data obtained in Step 210. For example, based on the exemplary values represented in table 300 of FIG. 3, forecasting module 105 may determine that the min value for the products manufactured within an interval of the time period t of six months is 18 and the max value is 30, represented in months 5 and 3, respectively. Accordingly, ΔP equals 12 (e.g., (max (30)−min(18)=12) and Δt equals the absolute value of (max time period (3)−min time period (5)), which is 2. Therefore, based on the above exemplary values, the boundary values for the sinusoidal variables (A, B', C) and linear variables (m, B) are:

Sinusoidal:

Gain: $-120 <= A <= 120$

Rate: $-2 <= B' <= 2$

Phase: $0 <= C <= 31.42$

Linear:

Slope: $-12 <= m <= 12$

Y intercept: $-180 <= B <= 300$.

Forecasting module 105 may also perform a data enhancement process to determine data values for each of the variables in the determined equations (Step 230). In one embodiment, the forecasting process implements a biological search function or model. For example, a genetic algorithm to determine data values for the variables included in each of the one or more equations that reflect, or are close to reflecting, data values that produce forecast results corresponding to a target value or values. For instance, the data values determined by the genetic algorithm implemented by embodiments of this invention may represent acceptable, or "best" data values for a variable in equations that would produce a result most reflective of a target value. One skilled in the art would appreciate that other types of data enhancement algorithms and/or methodologies may be implemented to determine the equations and/or associated best values for one or more of the variables in the equation. In this embodiment, the genetic algorithm may begin by creating a population table of information including data values for each variable in each equation determined in Step 220 (Step 231). The population table may include an arrangement of cells and may have a selected size based on the determined one or more equations. In this exemplary embodiment, five sinusoidal equations and five linear equations may be selected to populate the table. One skilled in the art would realize that any number of each type of equation may be selected to create the population table without departing from the scope of the invention.

Figure 4:
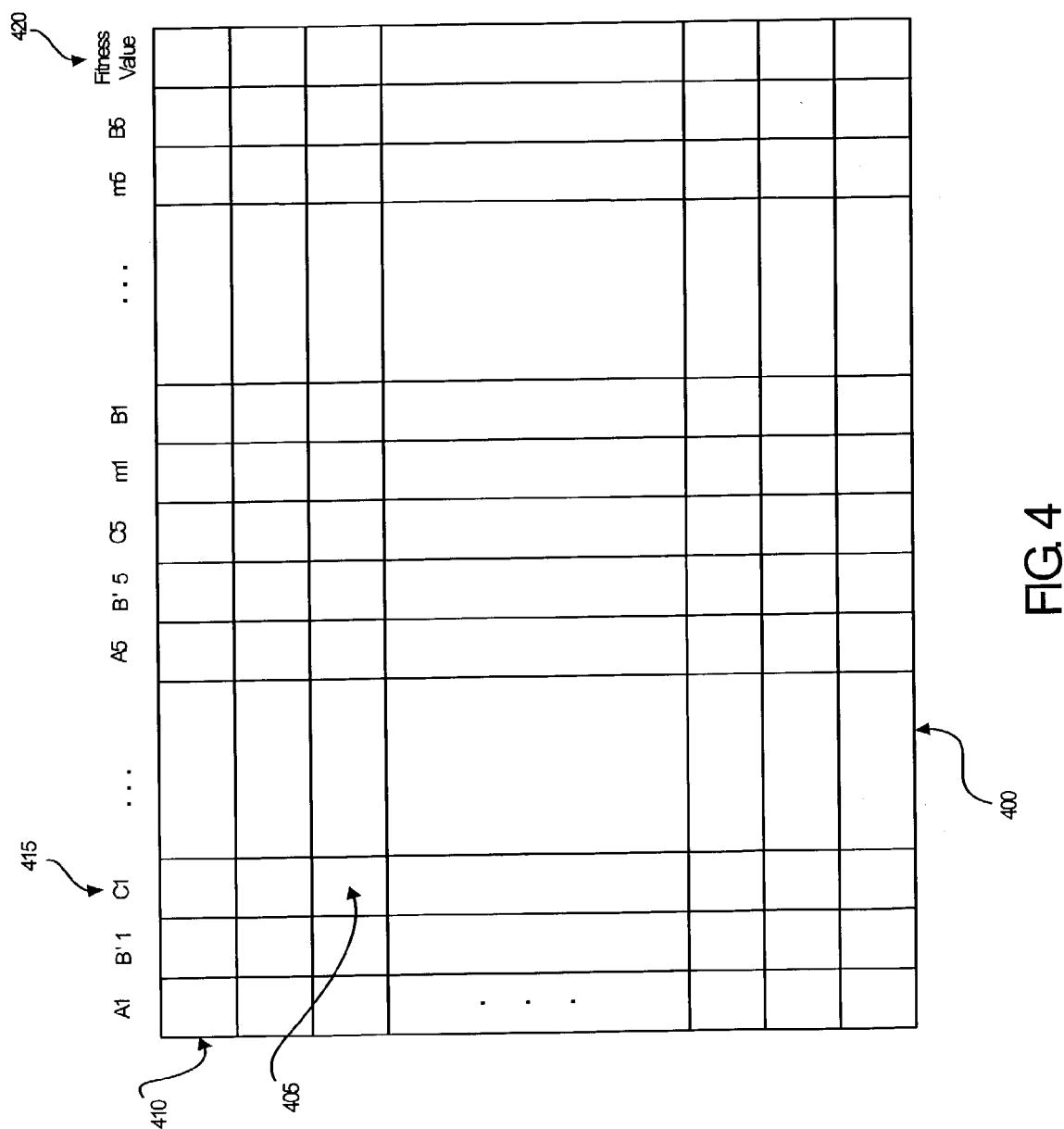
FIG. 4 illustrates a block diagram of an exemplary population table consistent with embodiments of the present invention.

FIG. 4 shows an exemplary population table 400 consistent with an embodiment of the invention. As shown, table 400 includes a plurality of cells 405 configured in an array of rows 410 and columns 415. Each cell 405 may be referred to as a gene and each row 410 may be referred to as a chromosome. A chromosome may be described as an identifier for a potential solution (e.g., an identifier for a set of values for the relationship variables that may be used to provide a solution to the forecasting model.). The total number of chromosomes in a population table is a function of the equations used in the method, which may be represented by the number of columns. For instance, the number of chromosomes 410 in table 400 may be determined as a function of the number and type of equations forming the relationship, and the number of columns in table 400 may depend on the number and type of equations. The size of exemplary table 400 may be estimated based on one or more factors, such as processing efficiency. For example, a large number of chromosomes may be selected, thus increasing the size of table 400. However, the effectiveness of processing the chromosomes may be reduced based on the size of the table. Accordingly, the number of chromosomes 410 in table 400 may be determined based on a product of the number of columns and a variable W, where W is an integer greater than 1. Because there may be a point of diminishing returns associated with a high number of chromosomes, the value of W may be determined to reduce the inefficiencies associated with processing a large number of chromosomes 410. The manner in which the columns 415 in table 400 are assigned may be implementation dependent or assignments may be random. In one embodiment, the assignments of the columns in table 400 do not affect the outcome of the forecasting process and therefore may be made in a manner easiest to understand for a user or process implementing the forecasting process. Therefore, because in this example there are a total of 15 sinusoid columns (e.g., 5 sinusoid equations *3 variables (A, B', C)) and 10 linear columns (e.g., 5 linear equations *2 variables (m, B)), the total number of chromosomes in table 400 is 500 (e.g., 25 columns *W=500, where W=20). In one embodiment, a user may select the value for W prior to, or during, the data enhancement process. Alternatively, the value for W may be selected automatically by forecasting module 105.

Once the configuration of the population table is determined, forecasting module 105 may populate the table with randomly chosen values for the variables within their corresponding boundary values. For example, cell 405 in table 400 may be populated with a data value that is randomly chosen between the boundary values for the phase variable C for a sinusoidal equation. Thus, cell 405 may include a data value from 0 to 31.42 based on the exemplary boundary values determined from the exemplary data in table 300 shown in FIG. 3.

Once each cell in table 400 is populated with a corresponding data value, forecasting module 105 may determine a fitness value for each chromosome 410 in table 400 (Step 232). A fitness value may be calculated using a goal function that determines how close a calculated chromosome value (e.g., a value determined from plugging data values into the relationships associated with the chromosome) is to an actual chromosome value based on the historical data collected in Step 210. In one embodiment, the goal function (GF) has the formula:

$$GF = e_{avg} * (e_{max})^n$$

where, $e_{avg}$ is the average error associated with a calculated value (e.g., a value determined from plugging data values into the relationships associated with a chromosome) and an actual error for a particular corresponding chromosome, $e_{max}$ is the maximum single point error associated with the historical data values for the target item (e.g., FIG. 3, 305) and the calculated target item values (e.g., the values returned when solving the equations for y, FIG. 3, 310), and n is an integer greater than zero (e.g., 1, 2, 3, etc.). The value of n may be determined by a user operating forecasting module 105 or may be determined by forecasting module 105 automonously. Further, the value of n may be changed prior, during, or subsequent to the performance of the forecasting process by forecasting module 105.

To calculate the average error, forecasting module 105 sums the error for each interval within time period t and divides by the time period t. To determine the error for each interval, forecasting module 105 uses the given equations and current variables values to calculate the y data value corresponding to each historical data value collected in Step 210 (e.g., each month of table 300). To determine the y value for each interval, forecasting module 105 sums the solution (e.g., y value) for each equation selected in Step 220 based on the various variables stored in the population table. For example, based on the data values for each cell in table 400, the calculated data values for each month corresponding to table 300 are:

Time Interval t=1

$$y1 = A1\mathrm{Sin}(B'1t+C1) + A2\mathrm{Sin}(B'2t+C2) + \ldots A5\mathrm{Sin}(B'5t+C5) + m1X + B1 + \ldots + m5X + B5$$

$$y1 = A1\mathrm{Sin}(B'1+C1) + A2\mathrm{Sin}(B'2+C2) + \ldots A5\mathrm{Sin}(B'5+C5) + m1 + B1 + \ldots + m5 + B5$$

Time Interval t=2

$$y2 = A1\mathrm{Sin}(B'1(2)+C1) + A2\mathrm{Sin}(B'2(2)+C2) + \ldots A5\mathrm{Sin}(B'5(2)+C5) + m1(2) + B1 + \ldots + m5(2) + B5$$

Time Interval t=3

$$y3 = A1\mathrm{Sin}(B'1(3)+C1) + A2\mathrm{Sin}(B'2(3)+C2) + \ldots A5\mathrm{Sin}(B'5(3)+C5) + m1(3) + B1 + \ldots + m5(3) + B5$$

Time Interval t=4

$$y4 = A1\mathrm{Sin}(B'1(4)+C1) + A2\mathrm{Sin}(B'2(4)+C2) + \ldots A5\mathrm{Sin}(B'5(4)+C5) + m1(4) + B1 + \ldots + m5(4) + B5$$

Time Interval t=5

$$y5 = A1\mathrm{Sin}(B'1(5)+C1) + A2\mathrm{Sin}(B'2(5)+C2) + \ldots A5\mathrm{Sin}(B'5(5)+C5) + m1(5) + B1 + \ldots + m5(5) + B5$$

Time Interval t=6

$$y6 = A1\mathrm{Sin}(B'1(6)+C1) + A2\mathrm{Sin}(B'2(6)+C2) + \ldots A5\mathrm{Sin}(B'5(6)+C5) + m1(6) + B1 + \ldots + m5(6) + B5$$

As shown in FIG. 3, the calculated data values for y1–y6 (310) are used by forecasting module 105 to determine the error (315) for each month. Forecasting module 105 determines the error by calculating the difference between the calculated data values and the actual data values for each interval in time period t. Once the error for each interval is determined, forecasting module 105 may then determine the average error $e_{avg}$ of the time interval by summing the error data values for each interval (e.g., months 1–6 in table 300) and dividing by the time period t (e.g., t=6 in table 300).

The average error $e_{avg}$ and the maximum error $e_{max}$ are used to determine the fitness value for the corresponding chromosome whose variables were used to calculate the average error. For example, the fitness value for the first chromosome 410 in table 400 is equal to:

$$FV(\text{chromosome } 1) = e_{avg} * (e_{max})^n.$$

The fitness value is calculated using the average error $e_{avg}$ that was determined using the cells in chromosome 1 (410), the largest error data value ($e_{max}$) corresponding to the calculated error from the historical data (e.g., row 315 in table 300), and a predetermined value for n (e.g., n=2).

Further, forecasting module 105 determines the average error $e_{avg}$ for each chromosome in the population table and use the calculated average error, the maximum error, and the data value n to determine a fitness value for each corresponding chromosome in the population table. In one embodiment, forecasting module 105 may store the fitness value for each chromosome in table 400, as shown as column 420 in FIG. 4.

Referring back to FIG. 2, once the fitness values for each chromosome is determined, forecasting module 105 may eliminate the less accurate chromosomes. For example, forecasting module 105 may sort the population table in an ascending order based on the determined fitness values (Step 233). Because the forecasting process is attempting to minimize the fitness value to a predetermined threshold value, the lower the value of the fitness value, the better (or more accurate) the variables in the corresponding chromosome are for forecasting the target item. The predetermined threshold value may be input by a user, or preprogrammed etc. The threshold value represents a performance threshold by which to gauge the performance of the model.

Once the population table is sorted, forecasting module 105 may select a certain number of chromosomes to eliminate from the population table (Step 235). In one embodiment, forecasting module 105 selects a certain percentage (e.g., 10–33%) of chromosomes to be removed from the bottom of the population table. Accordingly, in the exemplary table 400 shown in FIG. 4, if 10% of the chromosomes are selected, the bottom 50 of the data values, or the rows themselves, are removed from the table 400.

Forecasting module 105 may also repopulate the table with new rows for the ones removed by performing a reproduction process that replenishes the chromosomes removed in Step 235 with new chromosomes (Step 237). In one embodiment, forecasting module 105 may select identifiers associated with potential forecasting equations (i.e., chromosomes) and associated variables. Each selected chromosome may be modified by switching a randomly selected portion of the chromosome with another randomly selected portion of the same chromosome. Module 105 may reinsert the modified chromosomes into the population table, replacing the selected chromosomes. For example, in one embodiment, forecasting module 105 selects two chromosomes, or parents, from the population table at random using a scheme that favors the chromosomes with better fitness values (e.g., lower fitness values). The chromosomes for each of the two selected parents are then cut at a randomly chosen position, referred to as a crossover point. The slicing of the chromosomes results in two head and tail segments, which are swapped to produce two full-length chromosomes known as offspring. The two offspring chromosomes are then placed back into the population table, thus replacing the positions of two chromosomes previously removed from the table. The above described reproduction process may be repeated by forecasting module 105 until each removed chromosome is replaced with an offspring chromosome. Accordingly, when forecasting module 105 completes the reproduction process, the population array will be the same size as it was prior to Step 235.

Figure 5A:
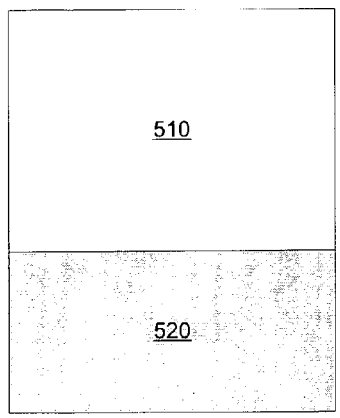
FIGS. 5A–5D illustrate block diagrams reflecting an exemplary reproduction process consistent with embodiments of the present invention.
Figure 5B:
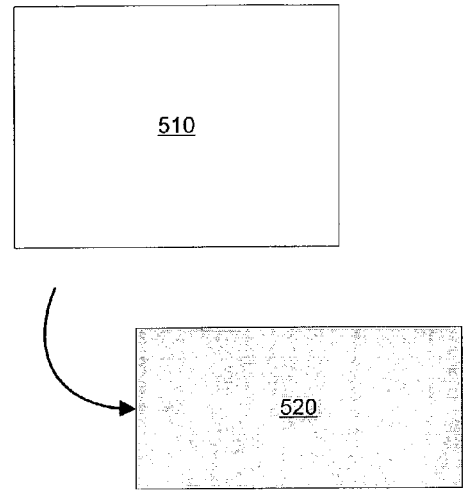
Figure 5C:
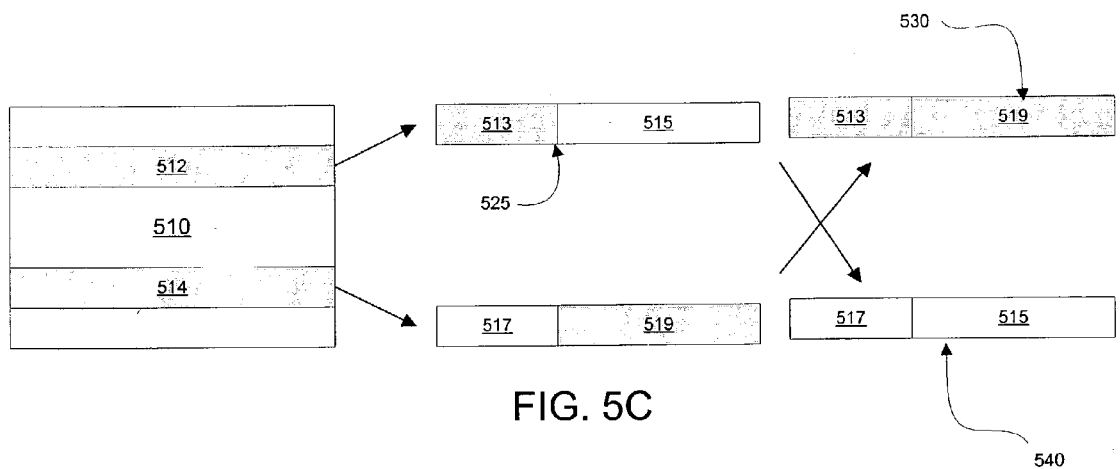
Figure 5D:
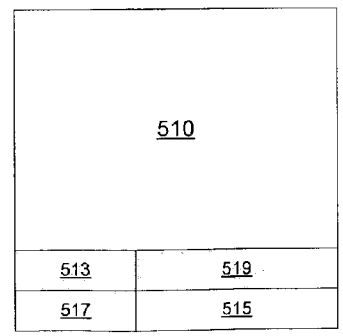

To further illustrate the reproduction process, consider the exemplary block diagrams shown in FIGS. 5A–5D. As shown in FIG. 5A, an exemplary population table 501 includes a portion 520 reflecting a set of chromosomes that are selected for removal and a portion 510 reflecting a set of chromosomes not selected for removal. In FIG. 5B, portion 520 is removed from the population table leaving portion 510. The memory locations associated with portion 520 may be physically available to forecasting module 105, but the data values for each cell in portion 520 may be deleted. In FIG. 5C, forecasting module 105 may randomly select two parent chromosomes 512 and 514 from portion 510. Also a crossover point 525 is selected. The crossover point 525 is used by forecasting module 105 to split each parent chromosome into a head portion 513, 517 and a tail portion 515, 519. The tails portions of each parent chromosome are then swapped to create two offspring chromosomes 530 and 540. Subsequently, as shown in FIG. 5D, the offspring chromosomes 530 and 540 are added to portion 510 to create a new population table 505. The process described in FIGS. 5C and 5D may be repeated until there are enough new offspring chromosomes to replace the number of chromosomes included in portion 520. Consequently, the number of chromosomes in population tables 505 and 501 will be the same.

Referring back to FIG. 2, forecasting module 105 may also perform a mutation process that includes changing the data values of a randomly selected number of cells in the population table (Step 239). In one embodiment, forecasting module 105 may select a certain percentage of cells (e.g., 0.1–3%) in the population table. For each selected cell, forecasting module 105 randomly selects a new data value for the cell based on the boundary values associated with the cell's corresponding variable. For example, if a cell selected for mutation is located in a gain column (e.g., "A") in population table 400 shown in FIG. 4, then the new data value will be constrained by the boundaries $(-\Delta P*10) <= A <= (\Delta P*10)$.

Following Step 230, forecasting module 105 may determine whether the best fitness value (e.g., the smallest) in the population table is converging toward a target value (Step 240). In one embodiment, forecasting module 105 may compare the best fitness value with a previous best fitness value. If the difference between the previous and current best fitness values is within a predetermined threshold, the forecasting process has determined a convergence point (e.g., a data value equal to, or within a predetermined range of, the target value) (Step 240; YES). If, on the other hand, the difference between the best and previous fitness values is not within the predetermined threshold, the data enhancement process (Step 230) is repeated until the convergence point is obtained (Step 240; NO). Alternatively, the best fitness value may be compared to a threshold value to determine whether a convergence point has been obtained.

When forecasting module 105 determines that the convergence point has been reached, the data values for each cell in the chromosome corresponding to the best fitness value are used to solve the one or more equations selected in Step 220 (Step 250). For example, referring to FIG. 4, if chromosome 410 is selected as the best fit chromosome based on its fitness value 420, the data values for A1, B'1, C1 through A5, B'5, and C5, and m1, B1 through m5, B5 associated with chromosome 410, are used to solve the equation $$y = A1\operatorname{Sin}(B'1t+C1) + A2\operatorname{Sin}(B'2t+C2) + \ldots A5\operatorname{Sin}(B'5t+C5) + m1X+B1 + \ldots + m5X+B5, \text{ for a selected time t and X.}$$

Accordingly, forecasting module 105 may forecast the value for y at a future time "t" and "X" by using the data values from the best fit chromosome.

Once the selected one or more equations are solved using the variables from the most fit chromosome, forecasting module 105 may determine an error value and a confidence value that is associated with the forecasted information determined in Step 250 (Step 260). Accordingly, forecasting module 105 may produce a forecasted characteristic for a target item that includes an error value and a confidence factor that reflects a level of confidence in the forecasted data values. In one embodiment, the error value is based on the average error $e_{avg}$ that is associated with the goal function (GF). To determine the confidence factor, forecasting module may perform a statistical process that performs an F-Test, or similar statistical process, on the calculated (forecasted) data values and the historical data values for the characteristics of the target item. The F-test produces a data value representing a probability of the calculated characteristic data values being true. The probability data value is then converted into a confidence factor representing a percentage of confidence in the forecasted characteristic data values determined in Step 250. For example, forecasting module 105 may provide forecasted information for characteristics of a target item that includes a predicted data value with an error and a confidence factor.

The confidence factor may be used by forecasting module 105, or a user, to determine whether the forecasted data values should be implemented. For instance, suppose based on the historical characteristic data values shown in table 300, forecasting module 105 determines that in 36 months (e.g., t=36), the demand for a product manufactured by a business may be 36 units, plus or minus 3 units (i.e., potential error of 3), with a confidence factor of 90%. Based on the high level of confidence in the forecasted number, a user, or an analysis process performed by processor 110, may determine that 36–38 units should be manufactured to meet the predicted demand at the $36^{th}$ month interval. Alternatively, if the level of confidence is low (e.g., confidence factor of 60%), the user or forecasting module 105 may determine that additional units should be manufactured to ensure the business does not miss a sale due to insufficient inventory. Accordingly, methods, systems, and articles of manufacture may provide forecasted characteristic data values that include an error and confidence factor that provides an individual, or process, additional information for deciding whether or not to implement the forecasted data values.

INDUSTRIAL APPLICABILITY

Methods, systems, and articles of manufacture consistent with certain features related to the present invention allow a system to forecast values for a target item based on historical data associated with the target item. These methods and systems may be applied to any particular tangible and/or non-physical target item. In one embodiment, a target item may represent a product that is manufactured, delivered, and/or maintained by a business entity, such as a manufacturer. Non-limiting examples of a product may include a vehicle, parts of a vehicle, commercial and/or residential appliances, tools, food service products, and any type of product that may be designed, developed, created, generated, manufactured, delivered, and/or stored as inventory.

In another embodiment, a target item may represent an abstract item such as financial products including, but not limited to, stocks, bonds, government bills, etc. Also, in another embodiment, the non-physical item may represent mathematical representations, such as analysis results (e.g., vibration analysis, etc.).

Because methods and systems consistent with certain embodiments of the present invention forecast target item characteristics based on historical data associated with the target item, external factors that affect the historical characteristics of the target item may be analyzed by users and/or a computer system. While conventional forecasting processes attempt to determine the external factors that may affect the characteristics of a target item, embodiments of the present invention forecast the characteristics of a target item based on historical data that includes the affect of external factors to the characteristics of a target item, without having to identify relevant or external factors, or how they impact the target item. In one embodiment, an analysis program may be executed by a processor to determine the relationship between the characteristics of a target item and external factors that took place during the historical period of the monitored target item. For example, the production of highway construction equipment may be related to external factors such as government programs for funding highway construction, natural disasters (e.g., hurricanes), etc. Thus, the historical data for the production of highway construction equipment will follow the demand for their services. The forecasting for the production of the equipment will be based on historical data that takes into account the affect of these external factors. Accordingly, embodiments of the present invention prevent a user and/or a process from having to identify the most influential external factors on a target item prior to forecasting for the target item.

In another embodiment of the invention, the forecasting process shown in FIG. 2 may skip Step 220 and begin Step 230 without selecting one or more equations. In this embodiment, the data enhancement process 230 would create a population table with randomly selected data values corresponding to a selected number of columns. Forecasting module 105 uses the random data values to determine the error for each interval within a period of time by calculating the difference between each historical data value and the random data value. The average error is determined from the error values to calculate a fitness value for each chromosome in the population table and the data enhancement process continues from Step 232 as shown in FIG. 2.

In yet another embodiment of the present invention, forecasting module 105 may be configured to perform a process that analyzes the confidence factor and error data for each forecasted data value produced by the forecasting process shown in FIG. 2. The analysis process may provide a report to a user indicating whether the forecasted data value should be used by the user in accordance with the type of characteristics and target item forecasted. Alternatively, the analysis process may automatically provide result data reflecting whether the forecasted data values should be used or adjusted. The result data may be fed into another process that controls operations that are influenced by the result data, such as a manufacturing process planning mechanism. For example, the analysis process may determine that a forecasted value is proper and should be used based on a high confidence factor. Accordingly, the analysis process may feed the forecasted data values to a supply process that controls inventory for manufacturing a product associated with the forecasted data values.

The features, aspects and principles of the present invention may be implemented in various environments. Such environments and related applications may be specially constructed for performing the various processes and operations of the invention. The processes disclosed herein are not inherently related to any particular system, and may be implemented by a suitable combination of electrical-based components. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method of forecasting characteristics of a target item, comprising:
   determining one or more equations associated with forecasted characteristics of the target item, wherein each of the one or more equations includes one or more variables;
   determining a data value for each of the one or more variables that represents the characteristics of the target item more so than other data values;
   forecasting the characteristics of the target item by solving the one or more equations using the determined data values and a time period data value corresponding to a future time interval; and
   providing the forecasted data,
   wherein determining the data value includes performing a process that implements a genetic algorithm that generates a plurality of chromosomes corresponding to the data values for the one or more variables.

2. The method of claim 1, wherein the genetic algorithm determines a fitness value for each of the plurality of chromosomes in a population table, wherein the fitness value is derived from a goal function that is based on an average error and maximum error associated with a relationship between historical data and calculated data corresponding to the characteristics of the target item over a period of time.

3. The method of claim 2, wherein determining a data value for each of the one or more variables includes:
   identifying a chromosome with a fitness value that is converging toward a target value.

4. The method of claim 1, wherein determining one or more equations includes:
   determining boundary values for each of the one or more variables.

5. The method of claim 4, wherein the boundary values are based on at least one of a minimum and maximum value of monitored characteristics of the target item over a previous period of time, a time interval when the minimum value was monitored, and a time interval when the maximum value was monitored.

6. The method of claim 4, wherein the one or more equations includes a sinusoidal equation including a gain, rate, and phase variable.

7. The method of claim 6, wherein the boundary values for the gain variable is $(-\Delta P*10)$ and $(\Delta P*10)$, wherein $\Delta P$ is the difference between a minimum and maximum value of monitored characteristics of the target item over a previous period of time.

8. The method of claim 6, wherein the boundary values for the rate variable is $-\Delta t$ and $\Delta t$, wherein $\Delta t$ is the difference between a time interval corresponding to a maximum value of monitored characteristics of the target item and a time interval corresponding to a minimum value of monitored characteristics of the target item took place.

9. The method of claim 6, wherein the boundary values for the phase variable is 0 and $(10*\Delta t*\Pi/2)$, wherein $\Delta t$ is the difference between a time interval corresponding to a maximum value of monitored characteristics of the target item and a time interval corresponding to a minimum value of monitored characteristics of the target item.

10. The method of claim 4, wherein the one or more equations includes a linear equation including a slope and y-intercept variable.

11. The method of claim 10, wherein the boundary values for the slope variable is $(\Delta P/-\Delta t/2)$ and $(\Delta P/\Delta t/2)$, wherein $\Delta t$ is the difference between a time interval corresponding to a maximum value of monitored characteristics of the target item and a time interval corresponding to a minimum value of monitored characteristics of the target item and ΔP is the difference between a minimum and maximum value of monitored characteristics of the target item over a previous period of time.

12. The method of claim 10, wherein the boundary values for the y-intercept variable is (−10*min) and (10*max), wherein mm and max are the minimum and maximum values, respectively, of monitored characteristics of the target item over a previous period of time.

13. The method of claim 1, wherein the target item is a tangible product and the characteristics include at least one of a number of tangible products manufactured, delivered, shipped, bought, sold, and ordered.

14. The method of claim 2, wherein the goal function is $e_{avg} * (e_{max})^n$ wherein $e_{avg}$ is an average error associated with a calculated characteristic data value and an historical characteristic data value for a corresponding chromosome, $e_{max}$ is a maximum error value associated with the actual characteristic value and the calculated characteristic value at some interval within the period of time, and n is a positive integer value.

15. The method of claim 1, wherein determining a data value includes:
    collecting a set of historical data values corresponding to characteristics of the target item for each of a plurality of intervals within a period of time;
    determining, for each interval, a calculated data value corresponding to calculated characteristics of the target item;
    determining, for each interval, an error value corresponding to a difference between the calculated and actual data values; and
    determining an average error value based on the determined error values.

16. The method of claim 15, wherein determining a calculated data value includes:
    solving, for each interval, the one or more equations using randomly selected data values for each of the corresponding one or more variables.

17. The method of claim 16, wherein the average error is used to determine a fitness value for each of a plurality of chromosomes in a population table.

18. The method of claim 1, further including:
    determining a confidence factor reflecting a level of confidence in the forecasted value.

19. The method of claim 18, further including:
    determining an error factor that reflects a range of characteristic data values associated with the forecasted characteristics.

20. A system for forecasting characteristics of a target item, comprising:
    a database including a collection of historical data corresponding to monitored characteristics of the target item over a previous period of time; and
    a forecasting computer system for executing instructions stored on a memory device that performs a forecasting process that determines predicted characteristics of the target item for a future point in time, wherein the forecasting process includes, when executed by the forecasting computer system:
    determining one or more equations associated with forecasted characteristics of the target item, wherein each of the one or more equations includes one or more variables;
    determining a data value for each of the one or more variables that represents the characteristics of the target item more so than other data values;
    forecasting the characteristics of the target item by solving the one or more equations using the determined data values and a time period data value corresponding to a future time interval; and
    providing the forecasted data.

21. The system of claim 20, wherein determining a data value includes:
    retrieving, from the database, a set of historical data values corresponding to characteristics of the target item for each of a plurality of intervals within a selected period of time;
    determining, for each interval, a calculated data value corresponding to calculated characteristics of the target item;
    determining, for each interval, an error value corresponding to the difference between the calculated and historical data values; and
    determining an average error value based on the determined error values.

22. The system of claim 21, wherein determining a calculated data value includes:
    solving, for each interval, the one or more equations using randomly selected data values for each of the corresponding one or more variables.

23. The system of claim 22, wherein the average error is used to determine a fitness value for each of a plurality of chromosomes in a population table.

24. A computer-readable medium including instructions for performing a method, when executed by a processor, for forecasting characteristics of a target item, the method comprising:
    determining one or more equations associated with forecasted characteristics of the target item, wherein each of the one or more equations includes one or more variables;
    determining a data value for each of the one or more variables that represents the characteristics of the target item more so than other data values;
    forecasting the characteristics of the target item by solving the one or more equations using the determined data values and a time period data value corresponding to a future time interval; and
    providing the forecasted data.

25. The computer-readable medium of claim 24, wherein determining a data value for each of the one or more variables includes:
    performing a process that implements a genetic algorithm that generates a plurality of chromosome that includes the best data values for the one or more variables.

26. The computer-readable medium of claim 25, wherein the genetic algorithm determines a fitness value for each of a plurality of chromosomes in a population table, wherein the fitness value is derived from a goal function that is based on an average error and maximum error associated with a relationship between historical data and calculated data corresponding to the characteristics of the target item over a period of time.

27. The computer-readable medium of claim 26, wherein determining a data value for each of the one or more variables includes:
    identifying a chromosome with a fitness value that is converging toward an optimum value.

28. The computer-readable medium of claim 24, wherein determining one or more equations includes:

determining boundary values for each of the one or more variables.

29. The computer-readable medium of claim 28, wherein the boundary values are based on at least one of a minimum and maximum value of monitored characteristics of the target item over a previous period of time, a time interval when the minimum value was monitored, and a time interval when the maximum value was monitored.

30. The computer-readable medium of claim 24, wherein the method further includes:

determining a confidence factor reflecting a level of confidence in the forecasted value.

31. The computer-readable medium of claim 30, wherein determining a confidence factor includes:

determining an error factor that reflects a range of characteristic data values associated with the forecasted characteristics.

* * * * *

UNITED STATES PATENT AND TRADEMARK OFFICE
CERTIFICATE OF CORRECTION

PATENT NO. : 7,213,007 B2  
APPLICATION NO. : 10/327676  
DATED : May 1, 2007  
INVENTOR(S) : Grichnik Page 1 of 1

It is certified that error appears in the above-identified patent and that said Letters Patent is hereby corrected as shown below:

In Column 12, Line 67, in Claim 11, delete "At" and insert -- $\Delta t$ --, therefor.

In Column 13, Line 9, in Claim 12, delete "mm" and insert -- min --, therefor.

Signed and Sealed this

Twelfth Day of August, 2008

JON W. DUDAS  
*Director of the United States Patent and Trademark Office*